United States Patent [19]

Pederson

[11] Patent Number: 5,783,035
[45] Date of Patent: Jul. 21, 1998

[54] TIRE DEBEADING MACHINE

[76] Inventor: Les H. Pederson, 4444 S. York St., Sioux City, Iowa 51106

[21] Appl. No.: 786,638

[22] Filed: Jan. 21, 1997

[51] Int. Cl.[6] .................................................. B32B 35/00
[52] U.S. Cl. .......................... 156/584; 156/344; 29/426.4; 29/426.6; 29/802; 83/175; 83/176; 225/93
[58] Field of Search .......................... 156/344, 584; 29/426.4, 426.5, 426.6, 802; 83/175, 176, 923; 225/93; 241/DIG. 31

[56] References Cited

U.S. PATENT DOCUMENTS

| | | |
|---|---|---|
| 3,713,361 | 1/1973 | Johnson et al. ................... 86/22 |
| 3,750,261 | 8/1973 | Iglehart et al. ................ 29/426.4 |
| 3,838,492 | 10/1974 | Uemura ............................ 29/427 |
| 4,711,005 | 12/1987 | Chang ............................. 29/24.5 |
| 4,873,759 | 10/1989 | Burch ............................. 29/700 |
| 5,319,834 | 6/1994 | Voigts ........................... 29/426.4 |
| 5,675,882 | 10/1997 | Hunt et al. .................. 29/426.5 X |

*Primary Examiner*—Mark A. Osele

[57] ABSTRACT

A tire debeading machine having a unique pair of hooks on a single shaft, clamp devices to close the hooks both to hold the bead in place within the hook and to press the bead into the hook to hold one end if the circular bead breaks. A divided die for the removal of matter from the bead provides an expedient way of cleaning the die if it becomes jammed. Further features include a cage to contain the tire both during the debeading process and as the process is finishing to control elastic reaction to the sudden removal of pressure, and a lift adapted to position tire casings of various sizes for contact by the hooks.

8 Claims, 2 Drawing Sheets

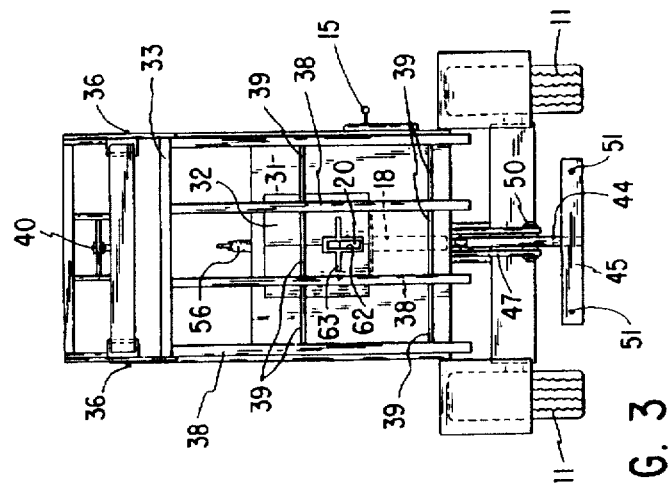
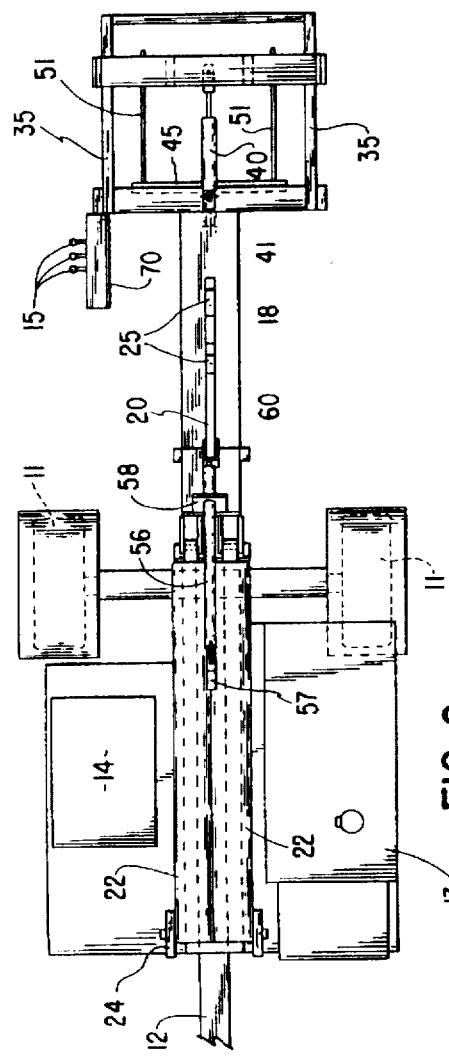
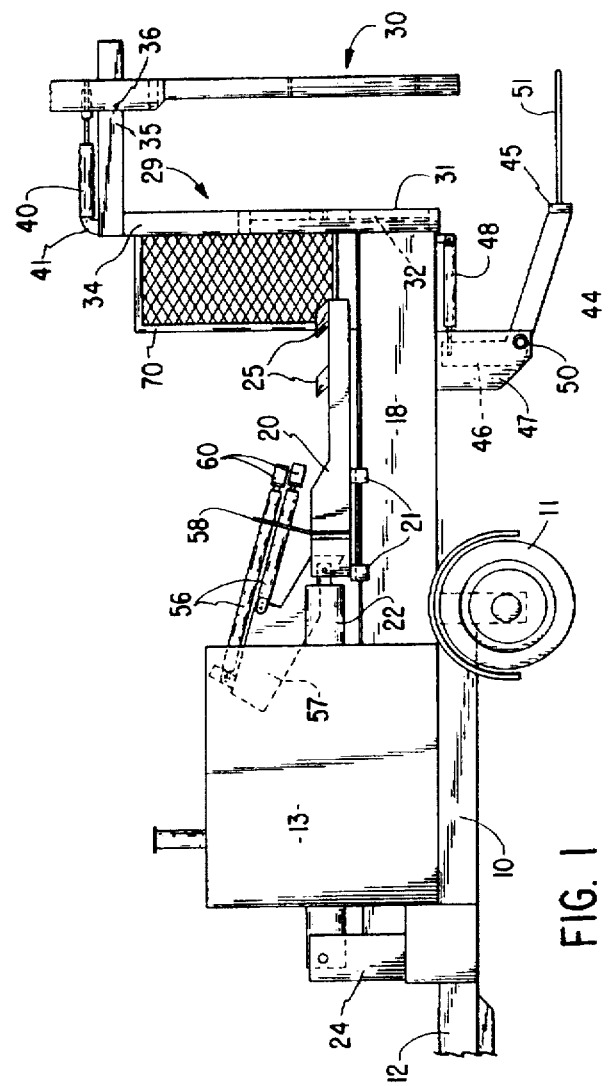

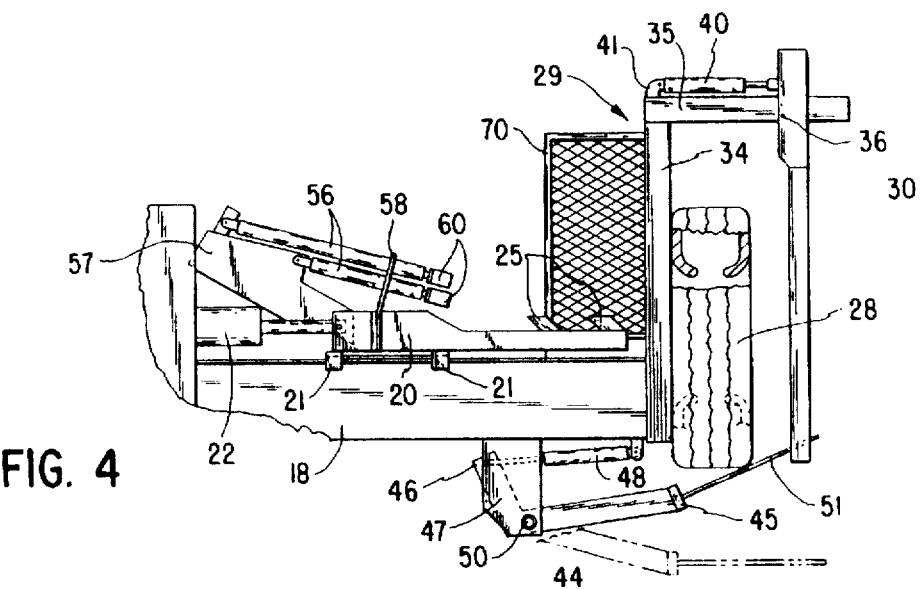
FIG. 4
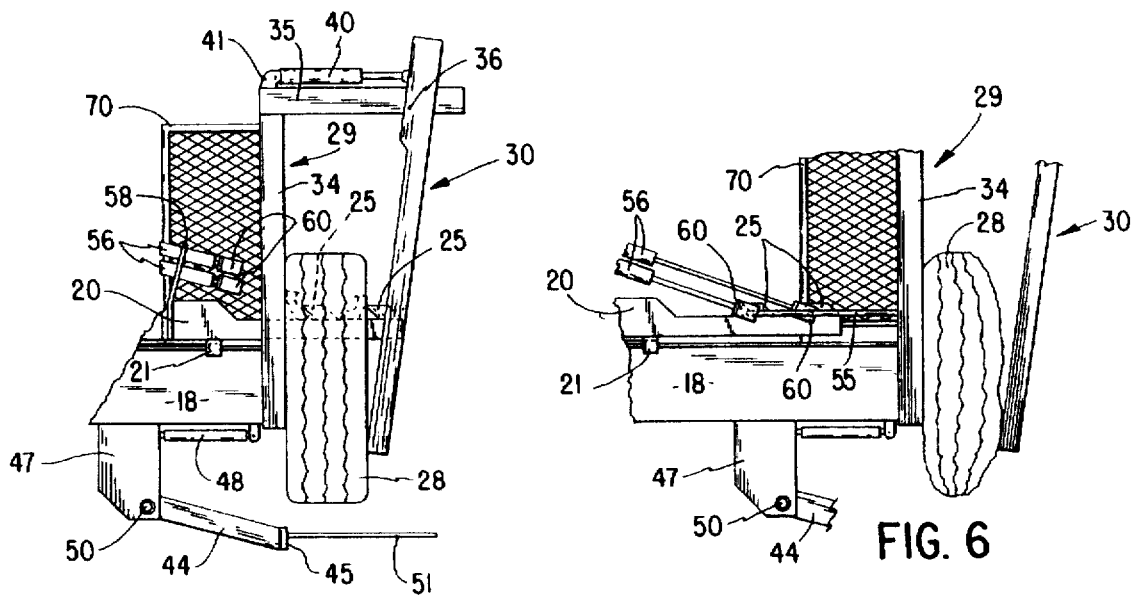
FIG. 5
FIG. 6
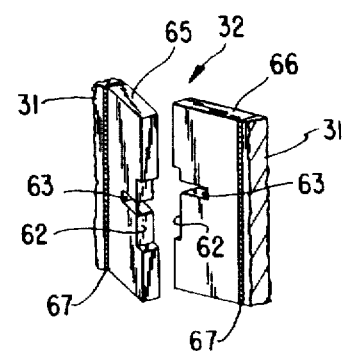
FIG. 7

TIRE DEBEADING MACHINE

BACKGROUND AND SUMMARY OF THE INVENTION

This application pertains to a machine to pull metal beading from pneumatic tire casings and more particularly to an improved debeader which will accomplish the purpose not only quicker and more safely but also more conveniently.

The casing for an ordinary pneumatic tire includes a bead at the inner diameter of the tire which is principally formed by a cluster of metal wires or the like enclosed in some rubber molded around the wire to fit the rim of the wheel on which the tire is to be mounted. The form has worked well to provide a tire sealed to the rim, and in general is a well-functioning device.

The problem solved by the present invention is found in the disposition of the casing when the tire has fulfilled its usefulness. At that time when the casing is to be disposed of, many problems arise. Currently, the least objectionable disposal seems to be either a complete shredding of the casing either for burning or as an aggregate in paving materials or possibly for baling of the casings to form bales usable as building blocks for retaining walls or the like. In both disposal methods, the presence of heavy steel wire in the bead seriously complicates the problem.

Machines now exist for pulling the wire from the tire. Such "debeading" machines generally operate by engaging the bead or the wire of the bead and then pulling of those wires singly through a die adapted to scrape the rubber off the wires. Nearly always the hook that engages the bead catches a single bead. Customarily the bead is cut at a location opposite to the point at which the hook engages the bead to ease the pulling.

Where more than one bead is to be pulled, the second is commonly pulled in a direction opposite to the first so that in essence, a completely duplicative machine is necessary to do the pulling. Also, the tire is generally then simply placed in an open space between the machines allowing the tire to be released randomly upon the final release of the bead or upon breakage of the wires - a situation which occurs only occasionally but may have severe results when it does.

By the present invention, the debeader uses unique double hooks on a single bar to pull two beads at a single operation and through a single stripping die. The die is unique in being easily cleaned to avoid being jammed with rubber. A holding device holds the tire casing securely during the pulling process so that it will not become a missile upon release of tension on the bead wires. And clamping devices engageable with the beads engaged by the hooks are available for the dual purpose of holding the bead upon release of tension, and of containing the bead in the hook in case of a break in the wires so that pulling can continue even though there are loose ends.

BRIEF DESCRIPTION OF THE DRAWINGS

FIG. 1 is a side elevational overall view of the debeader mounted on a trailer,

FIG. 2 is a top plan view of the device shown in FIG. 1.

FIG. 3 is an end view of the debeader showing the stripping die,

FIG. 4 is a side elevational view of the working parts of the machine and showing a tire elevated into position for engagement with the pulling hooks, FIG. 5 is a partial view similar to FIG. 4 showing the tire clamped in place and the pulling hooks about to engage the beads of the tire, FIG. 6 is a view similar to FIG. 5 with the hooks in the process of pulling the beads, and FIG. 7 is a detailed view of the split die partially open for cleaning.

DESCRIPTION

Briefly, this invention comprises a tire debeader in which the tire is enclosed, a double hook pulls both beads from the tire through a single easy-to-clean die and uses clamps for complete control of the bead as it is pulled. The machine also uses positioning devices to place the tire in position for pulling of the beads.

More specifically and referring to the drawings, the device may be mounted on a trailer having a frame 10 mounted on a pair of wheels 11 and adapted to be pulled by a tongue 12. Also mounted on the same trailer is the power unit 13 and a control box 14 which reacts to certain hand levers 15 to control the operation of the unit. The power supply is preferably an internal combustion engine operating a hydraulic pump which supplies hydraulic pressure to the operating piston and cylinder units under control of an operator using the levers 15 in a manner common in the art.

The debeading machine is mounted principally on a spine 18 fixed to the trailer frame 10. It will be apparent throughout that in locations where there is an adequate supply of casings, the spine 18 may be mounted on a fixed stand to take the place of the trailer. However, the trailer eases the problems of mobility of the unit so that type of mounting is ordinarily preferred.

The pulling bar 20 is slidably mounted for longitudinal movement on the spine 18. Clips 21 embracing flanges on the spine may be used for the mounting purpose. Power to operate the bar 20 is provided by a pair of hydraulic piston-cylinder assemblies 22.

One end of the assembly is fixed to the pulling bar 20, and the other end to a bracket 24 built up at an end of the spine 18. Pressure to the assemblies is provided from the power unit 13 and controlled by the operator. Preferably, the hydraulic units are double acting so that the bar 20 can be advanced as well as pulled.

On the bar, a pair of spaced hooks 25 is provided. These hooks 25 are spaced apart at a spacing approximately the width of the widest casing expected to be operated on by the debeader. Between the hooks, the bar is the same width as it is before the hook closest to the hydraulic units 22. In this way, a tire casing may rest on the bar on both sides of the hook closest to the hydraulic units 22 and have both beads resting on a portion of the bar while the tire is hanging in a near vertical position.

The tire 28 to be debeaded is held within a safety cage formed of a slatted wall 29 and a gate 30. The wall 29 is formed of a lower solid wall section 31 in which the stripping die 32 is held, and an upper slatted section having an upper horizontal member 33 and a series of vertical members 34. At the top member 33 a pair of arms 35 extends outwardly to provide a support to which the gate may be hinged at a pivot 36. The gate 30 itself consists of a simple rectangular framework having a series (preferably an even number) of vertical bars 38 adapted to engage the tire 28 (FIG. 3). Spacers 39 may be used to increase the rigidity of the bars 38. The frame extends above the pivots 36 far enough to provide some leverage to close the gate. To actuate the closure, a small hydraulic closing unit 40 is provided extending from a bracket 41 on the wall 29. Thus, the gate 30 can be moved from the open position shown in FIG. 4 to the closed position of FIGS. 5 and 6 in which the tire 28 is held between the gate 30 and the wall 29. For the sake of safety, the wall 29 and gate 30 are of dimensions to completely enclose the tire 28, or at least three-quarters of the tire so that the whole tire casing may be held within the cage.

Powered lift means is also provided to position the tire 28. This means includes a roughly T-shaped arm having a leg 44 and a cross member 45. The leg 44 is formed as a bell crank having an angled operating part 46 pivotally mounted on a bracket 47 fixed to the lower edge of the spine 18. A hydraulic unit 48 connected between an end of the operating pact 46 and the spine 18 may be used to pivot the leg 44 about its pivot 50. Fingers 51 attached to the cross members 45 and extending below the space between the wall 29 and gate 30 serve to support the tire 28. Thus, in its lowered position shown in FIGS. 1 and 5, the fingers 51 may be raised to the position shown in FIG. 4, thus elevating the tire.

In the actual pulling operation, as the wire bead portion 55 (FIG. 6) are pulled from the casing, there is always some danger of breakage of the wires, or sudden release from the casing. This can cause danger to the operator or, in the case of breakage, a loss of pulling power. Therefore, some safeguards in the form of holding devices may be provided. These devices include a ram-like hydraulic unit 56 for each hook. These rams are mounted on a plate 57 forming a part of the pulling bar 20. The ram units 56 are held in proper alignment by a fin 58 also on the pulling bar 20. Thus, each of the hydraulic ram units 56 is directed toward one of the hooks 25. A clamping end 60 is mounted on each of the rams 56 and is directed toward each hook 25. The end is formed in general U-shape to embrace the sides of each hook 25 and thus to clamp the wires 55 securely between the sides of the hook 25 and the walls of the clamp 60. It is now clear that the wires 55 are at all times in the hook and secure against flying loose around the area.

As is customary in debeading machines, a stripping die 32 through which the wires 85 are pulled, and which is supposed to strip the excess rubber off the wires, is mounted adjacent the holding area of the tire. In this case, that location is in the wall 29. In that die is provided a cross-shaped opening consisting of a vertical part 62 through which the pulling bar 20 can move and a horizontal part 63 through which the bead wires may extend as they are pulled. The edges on the horizontal part, in particular, should be relatively sharp so that excess rubber may be scraped from the wires. However, inevitably with use, these edges become less sharp and rubber may become jammed between the wire and the walls of the die.

In the preferred embodiment of the machine, the die is formed of two pieces of mirror image formation. They have been illustrated (FIG. 7) as split vertically through the center of the vertical part 62 of the opening, although it is conceived that a horizontal split might also be used successfully.

With the vertical division as shown, the principal parts are divided into a left-hand part 65 and a right hand part 66. These two parts are connected to the solid wall section 31 by a sturdy hinge 67 so that one section can be moved relative to the other, and both may be hingedly moved to open from the wall. The hinge 67 is operable only in the direction opposite to the pulling direction of the wires 55 so that while pulling, the die is kept securely closed. However, upon release of the pulling force, the parts of the die can be moved on the hinges to spread the openings to allow excess rubber to be readily cleared and removed for renewed pulling.

In use, when the gate 30 and the wall 29 are separated, a tire casing may be rolled between the wall 29 and gate 30 on to the space between the fingers 51 which should be in the lowered position. Actuation of the hydraulic device 48 will cause the fingers 51 to rise and lift the casing 28. As that casing rises high enough, the bar 20 can be extended to go through the central opening of the casing, at which time the fingers 51 may be lowered by the hydraulics 48, leaving the casing resting on the bar 20.

At that point, the hooks 25 should be in position for each to engage one of the opposite beads of the tire 28 to engage them in a pulling position. As the hydraulics 22 start pulling, the gate 30 is closed onto the casing 28 by the hydraulic device 40 so that the casing 28 will be held in place. As the pulling bar 20 increases the pulling tension, the clamp devices 60 may be pushed into holding engagement by the hydraulics 56 so that the bead wires being pulled will be firmly held between the clamp devices 60 and the hooks 25.

Further pulling of the wires 55 through the openings 63 in the die 32 results in the wire being removed from the casing and stripped by the die. This may result in a distortion in the casing as is suggested in FIG. 6. However, as the wire finally releases from the casing the resultant release of tension would normally result in a rapid release of the casing and would frequently result in a wildly flying casing. Because in the present device, the gate and wall 28 confine the casing, there is no release of the tire, and the force is simply contained in the machine.

It should be noted that a protective screen 70 may also be provided to protect the operator of the control levers 15 from other flying debris or loose rubber from the tire as the tension builds on the wires 55.

Throughout the application the various hydraulic devices have been described without noting that tubes or pipes lead from the power unit 13 to the individual units through the controls and are individually operated by the control levers 15. Such connections are so well known and common in the art that anyone working in the field would find such connections obvious. Therefore it is believed no further description is necessary. No claim is made to any particular type of connection nor to any mode or arrangement of such connection.

I claim as my invention:

1. For use with a debeading machine for pulling beads from tire casings, said machine having a pulling means and wall means adapted to hold said casing against the force of said pulling means, stripping die means adapted to clear excess casing material from said beads comprising a pair of mirror image parts hingedly attached to said wall means, said die means when closed being formed with an opening through which said beads are pulled, said parts being openable at said opening so that said die can be readily cleaned when separated.

2. The die means of claim 1 in which said parts are fastened to said wall means by hinges, said parts being of substantial thickness to provide corners on the sides adjacent said wall means, said hinges being attached to said parts at a corner such that pulling against said die will tend to force said parts in a direction to close said parts together.

3. For pulling beads from the casing of a pneumatic tire, a debeading machine comprising a spine, means mounted on said spine for securely holding the entire said casing, pulling means mounted on said spine in position to engage said beads while said casing is held, said pulling means comprising a pulling bar having at least one pair of hooks thereon, said hooks being spaced apart longitudinally on said spine by a distance such that each hook will engage a single bead on said casing, a stripping die mounted on said spine, said die providing an opening through which said pulling means extends to engage said beads, said die being thereby adapted to strip excess material from said beads, power means to provide force to said pulling means, and power actuated clamping means adapted to positively hold said bead within each of said hooks.

4. The machine of claim 3 in which said clamping means include hydraulic power units mounted on said pulling bar and having ends adapted to be forced against said hooks by hydraulic power.

5. For pulling beads from the casing of a pneumatic tire, a debeading machine comprising a spine, means mounted on said spine for securely holding the entire said casing, pulling means mounted on said spine in position to engage said beads while said casing is held, power device engaged with said pulling means to provide force to said pulling means, and power actuated clamping means adapted to positively hold said bead to said pulling means, a stripping die mounted on said spine adjacent said means for holding said casing, said stripping die providing an opening through which said beads are pulled to strip excess casing material from said beads said stripping die being formed of two parts divided at said opening, at least one of said parts being hingedly fastened so that it can be pivotally opened for cleaning said die.

6. The machine of claim 5 in which said means for holding said casing includes a wall device mounted on said spine, said parts of said stripping die being hingedly mounted on said wall device on a line remote from said opening whereby said die can be pivotally opened for cleaning.

7. The machine of claim 5 in which said pulling means includes a pulling bar slidably mounted on said spine and said power means includes at least one hydraulic cylinder and piston unit connected between said spine and said pulling bar, control means for said hydraulic unit mounted on said spine adjacent said wall device.

8. The machine of claim 7 in which a protective screen is mounted on said wall device adjacent said control means.

* * * * *